United States Patent [19]

Calhoon

[11] Patent Number: 4,877,658
[45] Date of Patent: Oct. 31, 1989

[54] WINDOW LINER FOR USE IN AIRCRAFT

[76] Inventor: Gale R. Calhoon, 4304 Stearns St., Long Beach, Calif. 90815

[21] Appl. No.: 158,536

[22] Filed: Feb. 22, 1988

[51] Int. Cl.$^4$ ............................................... E06B 3/64
[52] U.S. Cl. ...................................... 428/34; 156/109; 244/129.3; 428/122; 428/358
[58] Field of Search ................. 428/187, 34, 122, 358; 296/97.7; 156/109; 244/129.3

[56] References Cited

U.S. PATENT DOCUMENTS

| | | | |
|---|---|---|---|
| 2,939,186 | 6/1960 | Norwood et al. | 428/60 X |
| 3,192,575 | 7/1965 | Rosenau, Jr. et al. | 428/34 X |
| 3,194,725 | 7/1965 | Pounds | 428/520 X |
| 3,511,365 | 5/1970 | Dow | 428/31 X |
| 3,940,896 | 3/1976 | Steel | 52/307 |
| 4,172,613 | 10/1979 | Furando | 296/97.7 |
| 4,261,649 | 4/1981 | Richard | 296/97.7 X |
| 4,358,488 | 11/1982 | Dunklin et al. | 428/187 X |
| 4,364,533 | 12/1982 | Pompei et al. | 244/129.3 |
| 4,463,053 | 7/1984 | Brinegar | 428/442 |
| 4,528,232 | 7/1985 | Cliffe | 428/187 X |
| 4,541,595 | 9/1985 | Fiala et al. | 244/129.3 |
| 4,734,295 | 3/1988 | Liu | 427/64 |
| 4,749,222 | 6/1988 | Idland | 296/97.7 X |

FOREIGN PATENT DOCUMENTS 3447203  7/1986  Fed. Rep. of Germany ..... 296/97.7

OTHER PUBLICATIONS

Military Specification MIL-S-008806B (USAF) dated Sep. 21, 1970 entitled "Sound Pressure Levels in Aircraft, General Specification For".
"Possibility of Hearing Loss From Exposure to Interior Aircraft Noise" by Carl S. Pearsons and John F. Wilby, sponsored by Fed. Aviation Administration.
Publication of the State of California, Department of Industrial Relations entitled "Noise Control", No. S-680, Jun., 1985.

Primary Examiner—Henry F. Epstein
Attorney, Agent, or Firm—Charles H. Thomas

[57] ABSTRACT

A window liner is provided for use in an aircraft to aid in reducing glare, heat and noise level within the aircraft. A set of window liners according to the invention are installed in the existing frames of existing windows that are permanently mounted in an aircraft. The window liners are installed inwardly of the existing windows and are each comprised of a sheet of acrylic plastic surrounded by a resilient molding.

12 Claims, 2 Drawing Sheets

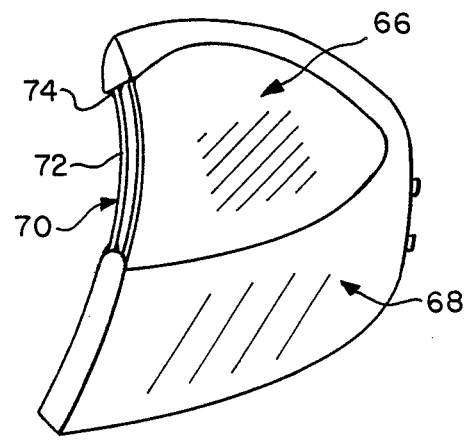
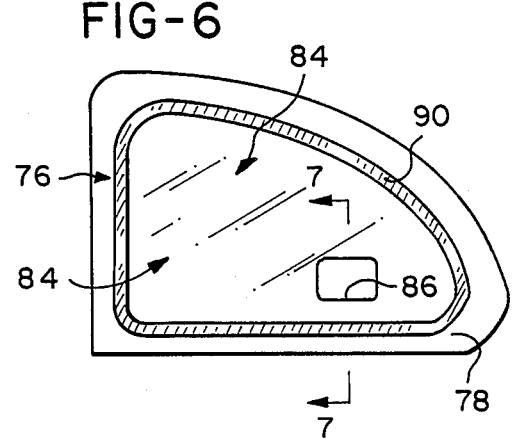
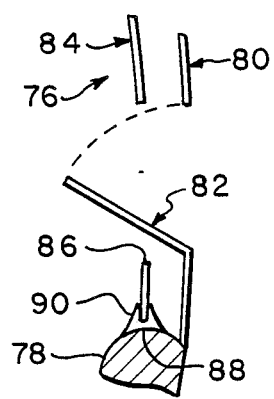

WINDOW LINER FOR USE IN AIRCRAFT

BACKGROUND OF THE INVENTION

Field of the Invention

The present invention relates to window liners to be installed in existing window frames inwardly of the permanent windows of an aircraft, and a method of reducing glare within an aircraft.

DESCRIPTION OF THE PRIOR ART

Commercial and private aircraft are equipped with sets of windows constructed of heavy glass and permanently installed within existing frames within the hull of an aircraft. The windows include windshields extending across the front of the aircraft to allow forward observation from the cockpit of the aircraft, and sets of laterally facing windows extending along both sides of the fuselage of the aircraft to allow observation of the external environment from within the cabin of the aircraft. In all but the smallest, low altitude aircraft the windows are secured with an airtight seal within the existing frames. In some aircraft the windshields, the pilot's windows and the cabin door windows are tinted. However, for the most part the windows of an aircraft are formed of clear sheets of optically uniform non-splintering safety glass. The regulations of the Federal Aeronautic Administration which govern the standards of the pilot compartment view and windshields and windows in an aircraft are set forth at 14 CFR, Chapter 1, Sections 23.773 and 23.775.

Certain problems have persisted in the aeronautic industry incident to the passage of light through conventional aircraft windows. Very frequently the pilots of aircraft do experience impaired visibility due to glare passing through conventional aircraft windows. Such glare frequently occurs in bright sunlight when a pilot in flight is relying upon visual observation as a primary means of assessment of the location of passing aircraft and surrounding terrain. As a consequence, mid-air collisions can and do occur because of inability to sight proximately located aircraft as a direct result of optical glare. Such mid-air collisions typically occur despite the existence of excellent weather for flying.

The existence of glare passing through conventional permanent aircraft windows also results in the generation of excessive heat within an aircraft, due to the free passage of solar radiation through conventional aircraft windows and the entrapment of infrared radiation therewithin. The resultant generation of heat within an aircraft can damage the avionics and the interior furnishings of the aircraft and also results in passenger discomfort.

SUMMARY OF THE INVENTION

In one broad aspect the present invention may be considered to be a liner for an existing window permanently mounted in an existing frame in an aircraft. The window liner of the invention is comprised of a sheet of transparent acrylic plastic having a perimeter configured to conform to the shape of the existing window, and a resilient molding engaging the perimeter of the acrylic sheet and formed with an interiorly directed groove adapted to receive and seize the perimeter of the plastic sheet. The molding has an exteriorly directed peripheral surface shaped to conform to the surface of the existing frame of an existing window inwardly of the existing window. Where permitted by applicable regulations, the acrylic sheet is preferably tinted.

By providing an aircraft with the improvement of the invention, glare to the occupants of the aircraft is substantially diminished. By decreasing glare in the cockpit of the aircraft, the likelihood of mid-air collisions in sunny skies is significantly reduced, as the visibility of surroundings, particularly elevated objects such as other aircraft, is improved. The reduction of glare passing through the windows of an aircraft also increases passenger comfort by reducing the amount of light reaching the passengers and by decreasing the amount of heat generated from entrapped solar radiation.

The inner aircraft window liner of the invention also serves to protect the avionics and cabin and cockpit interiors from the adverse effects of heat and direct sunlight resulting from excessive glare through the aircraft windows. The aircraft avionics are better protected from excessive temperature rise which would otherwise result from undiminished exposure to direct sunlight and reflected glare. Furthermore, it is well known that direct sunlight and reflected glare degrades cockpit and cabin furnishing such as upholstery, curtains and carpeting due to discoloration. Also, the exposure to excessive light shortens the useful life of certain plastics which experience accelerated crazing, cracking or decomposition. The use of the aircraft window inserts of the invention not only lengthens the serviceability of the cabin and cockpit furnishings of an aircraft, but also preserves the aesthetic appearance of these furnishings.

A further beneficial effect of the window inserts of the invention is that totally obscuring windshields are often unnecessary. That is, the windows of some aircraft are provided with opaque heat shields which slide within tracks to totally block a window. Such heat shields, while accomplishing the result of blocking unwanted direct and reflected light, also block all visibility. The window inserts of the invention accomplish the desirable result of diminishing glare from direct and reflected sunlight while still allowing observation through the aircraft windows with which they are installed.

The window inserts of the invention achieve a further beneficial result by reducing the level of noise within an aircraft. Noise from the engines of the aircraft as well as from external servicing vehicles and machinery is noticably reduced in an aircraft through the use of the window inserts of the invention.

The aircraft window liners of the invention are normally tinted to significantly reduce glare. However, Federal Aeronautic Administration regulations require that the windshield and side windows forward of the pilot's back, when he is seated in the normal flight position, must have a luminous transmittance value of not less than seventy percent. The aircraft window liners of the invention, when tinted, will still pass sufficient light to meet the seventy percent luminous transmittance requirement when employed in conjunction with clear permanent existing windows. However, when the permanently installed existing windows are themselves tinted, the use of tinted window inserts according to the invention would result in less than the required level of light transmittance. Accordingly, only clear, completely transparent window inserts should be utilized in conjunction with tinted windshields and side windows in a cockpit. Even a clear untinted window insert according to the invention will diminish glare by approximately twelve percent, however.

In another broad aspect the present invention may be considered to be a method of reducing glare within an aircraft. The method is comprised of lining existing windows that are permanently mounted within existing frames in an aircraft by inserting into the existing frames inwardly of the existing windows inner window liners each comprised of a sheet of transparent acrylic plastic having a perimeter of a size and shape which conforms to the size and shape of an existing window in the aircraft and a resilient molding formed with an interiorally directed channel adapted to seize and seal the edge of the acrylic plastic sheet therewithin and an exteriorally directed periphery shaped to seat upon the existing frames inwardly of the existing windows. Preferably, a curable adhesive is applied between the existing window frames and the exteriorally directed peripheries of the moldings prior to inserting the inner window liners into the existing frames.

The beneficial effects of the improvement of the invention are most pronounced with low wing airplanes, since airplanes with wings located above the cockpit derive some glare reduction which is provided by the aircraft wings. However, the invention is applicable in and will provide some beneficial glare reduction to all types of aircraft.

The invention may be described with greater clarity and particularity by reference to the accompanying drawings.

BRIEF DESCRIPTION OF THE DRAWINGS

FIG. 5 is a perspective view from outside of a cabin door illustrating an aircraft window liner installed in accordance with the present invention.

FIG. 6 is an interior elevational view showing an aircraft window liner according to the invention installed in a pilot's window.

FIG. 7 is a sectional detail taken along the lines 7—7 of FIG. 6.

DETAILED DESCRIPTION OF THE EMBODIMENTS AND IMPLEMENTATION OF THE METHOD

Figure 1:
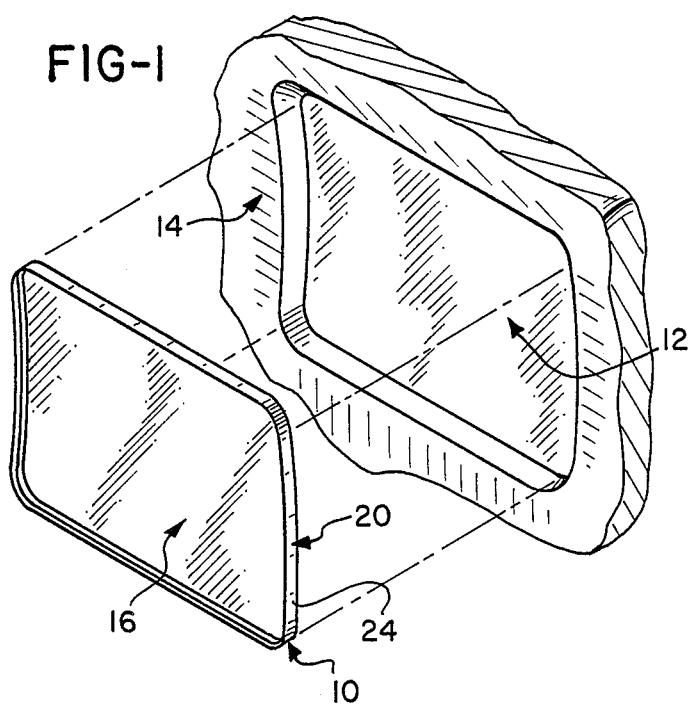
FIG. 1 is a perspective view illustrating the manner of installation of an aircraft window insert in a standard aircraft window according to the invention.

FIG. 1 illustrates an improvement for an aircraft which is a liner 10 for an existing window 12 permanently mounted in an existing window frame 14 in an aircraft. The windows and window inserts illustrated in the drawings are adapted to fit into a Beechcraft Bonanza Model A-36 aircraft, although it is to be understood that the window inserts of the invention may be installed in any aircraft having windows permanently installed within existing frames.

Figure 2:
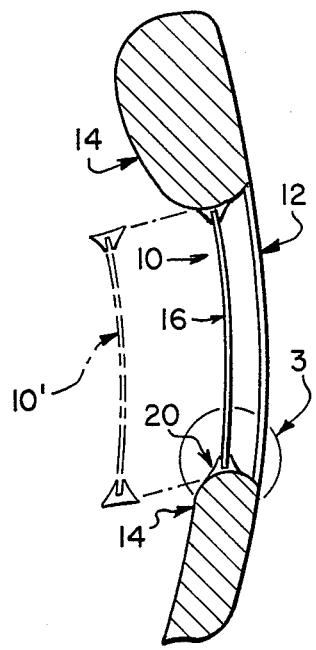
FIG. 2 is a sectional view of the window installation of FIG. 1.
Figure 3:
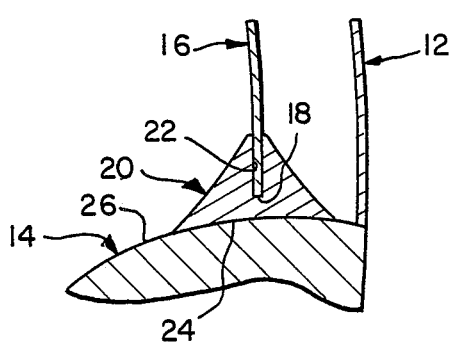
FIG. 3 is a sectional elevational detail indicated at 3 in FIG. 2.

The window liner 10 is comprised of a sheet 16 of transparent acrylic plastic sold under the registered trademark Acrylite by Cyro Industries located at 25 Executive Boulevard, Orange, Conn. 06477. The acrylic plastic sheet 16 has a perimeter 18 which, in order to conform to the shape of the existing window 12, is of a generally rectangular configuration having rounded corners. The aircraft window liner 10 is further comprised of a rubber molding 20, of generally triangular shaped cross-sectional configuration as illustrated in FIGS. 2 and 3. The molding 20 engages the marginal periphery of the acrylic plastic sheet 16, likewise as illustrated in FIGS. 2 and 3. The molding 18 is formed with an interiorally directed groove 22 which is adapted to receive and seize the perimeter 18 of the plastic sheet 16. The rubber molding 20 also has an exteriorally directed peripheral surface 24 shaped to conform to the surface 26 of the existing frame 14 of the existing window 12 inwardly of the existing window 12, as depicted in FIGS. 2 and 3.

The molding 20 is of generally triangular cross-sectional configuration and measures approximately seven eighths of an inch across its exteriorally facing base 24 and is approximately one half inch in height. The channel 22 is preferably about three eighths of an inch in depth and may be either one sixteenth or one eighth of an inch in thickness. When the window insert 10 is installed as indicated in solid lines in FIG. 2, the acrylic plastic sheet 16 resides in spaced separation of approximately one half of one inch from the existing glass window 12.

In the convention employed in association with the description of the drawings, the terms interior and interiorally refer to directions proceeding toward the center of the window insert 10 in the plane of the acrylic plastic sheet 16. The terms exterior and exteriorally refer to directions proceeding from the center of the window insert 10 toward the periphery thereof, likewise in the plane of the acrylic plastic sheet 16. The terms outer, outward and outwardly refer to a direction perpendicular to the plane of the acrylic plastic sheet 16 facing or proceeding therefrom toward the existing window 12 and toward the exterior of the aircraft in which the existing frame 14 is mounted. Likewise, the terms inner, inward and inwardly refer to a direction perpendicular to the plane of the acrylic plastic sheet 16 and proceeding or facing away from the existing window 12 and toward the interior of the aircraft cabin or cockpit.

To construct the aircraft window liner 10 the plastic sheet 66 is initially cut out four inches larger about its periphery than the existing window 12 to allow for subsequent contraction. A piece of felt is then taped over the outside of the existing window 12. The acrylic plastic sheet 16 is then preheated in an oven at 325 degrees Fahrenheit for approximately four to eight minutes depending upon the size of the window 12. The heated acrylic plastic sheet 16 is then taken out of the oven and placed over the taped felt and is hand shaped to conform to the shape of the existing window 12 on the outer surface thereof. The acrylic plastic sheet 16 is then cooled in that shape.

When cooled, the acrylic plastic sheet 16 is cut around its periphery one quarter inch smaller than the window frame 14. A length of the molding 20 is then installed upon the periphery of the acrylic plastic sheet 16 such that the interiorally facing or directed channel or groove 22 of the molding 20 snugly receives the edge of the acrylic plastic sheet 16 so that the perimeter 18 thereof is seated at the bottom of the groove 22. The ends of the length of the rubber molding 20 are then cut so that they meet in abutment totally encompassing the perimeter 18 of the acrylic plastic sheet 16. When the molding 20 is installed on the peripheral edge of the acrylic plastic sheet 16 both the rubber molding and the window frame are wetted with soapy water to allow the perimeter 18 of the acrylic plastic sheet 16 to slip in and form a good seal seated in the groove 22 of the molding 20. The ends of the molding are then glued together with a quick drying glue suitable for use with acrylic plastic, thereby completing construction of the window liner 10. One suitable glue is manufactured by Devcon Corporation located in Danvers, Mass.

To complete the installation, a drop of the same glue is placed on the exteriorly facing surface 24 of the molding 20, at each corner of the window liner 10 and upon the window frame 14, likewise in each corner. The window liner 10 is then moved from the position depicted in phantom lines at 10' in FIG. 2 and is pressed into the window frame 14. Since the exteriorly facing surface 24 is configured to conform to and seat against the existing window frame 14 inside of the existing window 12, the aircraft window liner 10 will appear to form a double window with the permanent window 12.

Should removal of the window liner 10 ever prove necessary, as for example to clean the outer surface thereof or the inner surface of the permanent window 12, a razor blade is inserted between the rubber molding 20 and the window frame 14 to slice through the glue at the corners of the window liner 10. The liner 10 can then be removed and reinstalled with new spots of glue at the corners.

In aircraft in which the pilot's window and the cabin door window are constructed of tinted glass, the acrylic plastic sheets utilized to construct the aircraft window inserts are preferably formed of Acrylite GP-1 011-9 colorless-clear plastic acrylic. Acrylite GP-1 acrylic plastic meets the luminous transmittance required in the aircraft industry in that it meets all of the requirements of Federal Specification L-P-391D for Type I grade C sheet, and specifically class II thickness tolerances of that specification. Additionally, Acrylite GP-1 acrylic plastic meets the requirements of optical uniformity as specified in Mil-P-5425D, Section 3.15.3.

Where the pilot's window and cabin door window are clear, the acrylic plastic sheet is preferably Acrylite GP-1 gray 147-7 or green 508-7 or green 564-9. The use of acrylic plastic sheets so specified will conform to the Federal Aeronautics Administration requirements for luminous transmittance of not less than seventy percent of incident light forward of the pilot's back when he is seated. For windows in the aircraft to the rear of the pilot's back Acrylite FF gray 103-2 or 143-4 or green 545-2 are preferably employed to form the acrylic plastic sheets of the aircraft window inserts of the invention. The acrylic plastic sheets at any window position are preferably from about one sixteenth to one eighth of an inch in thickness.

Figure 4:
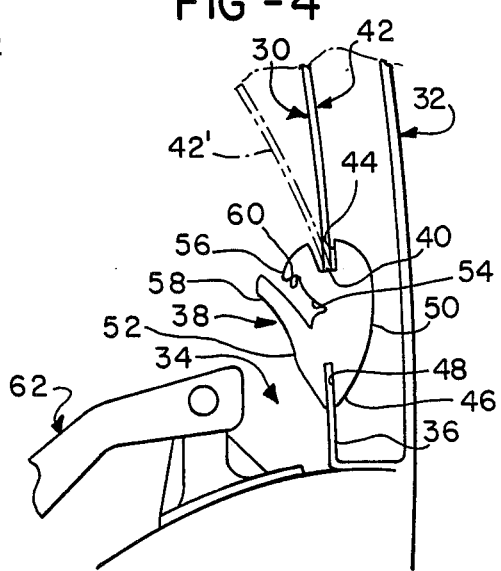
FIG. 4 is a sectional elevational detail illustrating an alternative embodiment of an aircraft window liner according to the invention for use with an emergency window in an aircraft.

The aircraft window insert 10 depicted in FIGS. 1–3 is of a construction generally suitable for a standard window in the fuselage which admits light into the cabin of an aircraft. However, there are certain window configurations within an aircraft which dictate the use of different embodiments of an aircraft window insert according to the invention. For example, FIG. 4 is a side elevational detail depicting an aircraft window insert 30 constructed in accordance with the invention for use with an existing emergency window 32. The emergency window 32 has an existing frame 34 which includes an interiorly directed metal rim 36 spaced inwardly from the existing emergency window 32.

A molding 38 is employed to capture the perimeter 40 of the aircraft plastic sheet 42. Like the molding 20, the molding 38 is formed with an interiorly facing channel or groove 44 in which the perimeter 40 of the acrylic plastic sheet 42 is seated. Unlike the molding 20, however, the molding 38 is formed as an endless rubber loop and has an exteriorly facing surface 46 in which an exteriorly facing channel 48 is defined to receive the rim 36 therewithin. The molding 38 is also formed with an outer surface 50 for facing the existing emergency window 32 and an inner surface 52 opposite the outer surface 50 and facing away from the existing emergency window 32. An inwardly facing recess 54 is formed in the inner surface 52 and is defined throughout the inner molding surface 52 to form an inwardly facing, laterally opening cavity that encircles the plastic sheet 42. The inner molding surface 52 also defines an overhanging lip 56 which extends completely along one side of the cavity or recess 54 and a compression flange 58 which extends completely along the opposite side of the cavity or recess 54. Both the lip 56 and the flange 58 circumscribe the acrylic plastic sheet 42. In an undeformed state, the compression flange 58 projects out over the overhanging lip 56 toward the inside of the cabin or cockpit such that the lip 56 is located between the compression flange 58 and the outer surface 50 of the molding 38. As illustrated in FIG. 4 the lip 56 is also located between the compression flange 58 and the groove 44.

The compression flange 58 is elastically deflectable and is resiliently compressible and insertable to seat in the cavity or recess 54 captured by the overhanging lip 56. That is, the compression flange 58 may be inserted into the cavity or recess 54 so that the tip thereof seats in a corresponding undercut seat 60 within the body of the molding 38.

To install the aircraft window insert 30, the rubber molding 38 is first mounted upon the interiorally directed rim 36 so that the rim 36 is seated in the exteriorally facing channel or groove 48. At this time the compression flange 58 is located as depicted in FIG. 4 and is directed inwardly toward the cabin or cockpit. At that time the plastic sheet 42 is positioned as indicated at 42' in dotted lines and is inserted into the channel 44. The structure of the rubber molding 38 is resiliently deflected so that the perimeter 40 of the plastic sheet 42 may be seated in the bottom of the channel 44 throughout the entire circumference of the plastic sheet 42, whereupon it resides in the position indicated in solid lines in FIG. 4. The compression flange 58 is then resiliently deflected into the cavity 54 and within the confines of the lip 56 throughout its length so that the tip of the compression flange 58 is captured by the lip 56 in engagement with the seat 60 throughout the entire length of the molding 38. While the flange 58 is seated in registration with the seat 60, it resides in an elastically compressed state within the recess 54. This causes the structure of the molding 38 to exert compressive forces on the plastic sheet 42 and for the plastic sheet 42 to be compressed within the interiorally directed channel 44. At the same time, the metal rim 36 is compressed within the exteriorally facing channel 48.

The emergency window 32 is provided with an emergency handle indicated at 62. Then the emergency handle 62 is pulled, the entire frame 34 carrying the permanent window 32, the rim 36 and the window insert or liner 30 may thereby be pushed outwardly to provide an escape opening in the event that the emergency door jambs.

FIG. 5 illustrates a existing aircraft window 66 installed in an outside aircraft cabin door 68 which serves as an existing frame for the existing window 66. It should be noted that the window 66 is of an irregular shape and is not generally rectangular as is the window 12. Nevertheless, an aircraft window insert 70 may be provided employing an acrylic plastic sheet 72 having a perimeter configured to conform to the shape of the perimeter of the existing window 66. The acrylic plastic sheet 72 is captured within a molding 74 formed in the manner described in the embodiments of FIGS. 1-3.

FIGS. 6 and 7 illustrate yet another embodiment of an aircraft window insert 76 according to the invention. The aircraft insert 76 is adapted for insertion into an existing frame 78 of a pilot's window 80. The pilot's window 80 is equipped with a smaller storm window 82, which, when closed, lies within the plane of the pilot's window 80. The storm window 82 is totally enclosed within and surrounded by the structure of the pilot's window 80. The storm window 82 may be hinged to the pilot's window 80 to open inwardly toward the cockpit, as illustrated in FIG. 7, or it may be mounted as a panel to slide across an enclosed opening defined in the pilot's window 80. In either event the aircraft window insert 76 employs an acrylic plastic sheet 84 which defines an opening or aperture 86 therewithin which is entirely surrounded by the structure of the plastic sheet 84 interiorally within the perimeter 88 thereof and in lateral registration with the storm window 82. The storm window 82 is thereby accessible through the aperture 86 in the plastic sheet 84. As with the other embodiments of the invention illustrated, the aircraft window insert 84 employs a rubber molding 90 which captures the peripheral edge of the acrylic plastic sheet 84.

Undoubtedly, numerous variations and modifications of the invention will become readily apparent to those familiar with aircraft windows and window installations. Accordingly, the scope of the invention should not be construed as limited to the specific embodiments of the aircraft window liner illustrated nor to the particular technique of reducing glare within an aircraft which has been described. Rather, the scope of the invention is defined in the claims appended hereto.

I claim:

1. A liner for an existing window permanently mounted in an existing frame in an aircraft comprising: a stiff sheet of transparent acrylic plastic from about one sixteenth to about one eighth of an inch in thickness having a perimeter firmly set and configured to conform to the shape of said existing window, and a resilient molding engaging said perimeter of said acrylic sheet and formed with an interiorally directed groove adapted to receive and seize said perimeter of said plastic sheet and having an exteriorally directed peripheral surface shaped to conform to the surface of said existing frame of said existing window inwardly of said existing window, whereby said acrylic plastic sheet is held in spaced separation from said existing window.

2. A liner according to claim 1 wherein said transparent acrylic plastic sheet is color tinted.

3. A liner according to claim 1 wherein said transparent acrylic plastic sheet is clear and untinted.

4. A liner according to claim 1 adapted for insertion into an existing frame of a pilot's window and which has a smaller, totally enclosed storm window therewithin and further characterized in that said acrylic plastic sheet defines an opening interiorally of said perimeter in a position of registration with said storm window.

5. A liner according to claim 1 adapted for insertion into an existing frame of an existing emergency window which has an interiorally directed metal rim located inwardly relative to said existing emergency window and said exteriorally directed peripheral surface of said molding defines an exteriorally facing channel adapted to receive said metal rim and said molding has an outer surface facing said existing emergency window and an inner surface facing away from said existing emergency window and said inner molding surface is formed with an inwardly facing recess, an overhanging lip on one side of said recess, and a compression flange wider than said recess projecting out over said overhanging lip in an undeformed state, and said flange is deflectable to seat within said recess entrapped therewithin by said overhanging lip to thereby cause said molding to exert compressive forces on said plastic sheet at said groove and on said metal rim at said exteriorally facing channel.

6. An improvement for an aircraft having existing windows permanently mounted in existing frames comprising window inserts each of which is comprised of a stiff sheet of transparent acrylic plastic from about one sixteenth to about one eighth of an inch in thickness and having an edge configuration firmly set to conform to the size and shape of an existing window of said aircraft and a resilient molding extending about the entire perimeter of said edge of said acrylic plastic sheet and formed with an interiorally facing channel which snugly receives said edge of said acrylic plastic sheet and an exteriorally facing surface configured to conform to and seat against an existing window frame of an aircraft inside of an existing window therein and in spaced separation from said existing window.

7. An improvement according to claim 6 wherein said transparent acrylic plastic sheet is color tinted.

8. An improvement according to claim 6 wherein said acrylic plastic sheet is clear.

9. An improvement according to claim 6 for use with an existing pilot's window within an aircraft in which said pilot's window is equipped with a smaller, totally surrounded, storm window, further characterized in that said acrylic plastic sheet defines an aperture therewithin entirely surrounded by the structure of said plastic sheet and in registration with said storm window, whereby said storm window is accessible through said aperture in said plastic sheet.

10. An improvement according to claim 6 for use with an aircraft which has an existing emergency window which employs an existing frame having an interiorally directed rim spaced inwardly from said existing emergency window wherein said exteriorally facing surface of said molding of one of said inserts defines an exteriorally facing channel to receive said rim therewithin and wherein said resilient molding also has an outer surface for facing said existing emergency window and an inner surface opposite said outer surface and a cavity is defined in said inner molding surface and said inner molding surface defines an overhanging lip which extends along one side of said cavity and a flange which extends along the opposite side of said cavity whereby when said flange is in an undeformed state said lip is located between said flange and said outer molding surface, and said flange is resiliently compressible and is insertable into said cavity whereupon it resides in an elastically compressed state therewithin, thereby causing said acrylic plastic sheet to be compressed within said interiorally facing channel and said rim to be compressed within said exteriorally facing channel.

11. A method of reducing glare within an aircraft comprising lining existing windows that are permanently mounted within existing frames in said aircraft by inserting into said existing frames in spaced separation from said existing windows inner window liners each comprised of a stiff sheet of transparent acrylic plastic from about one sixteenth to about one eighth of an inch in thickness and having a perimeter of a size and shape firmly set to conform to the size and shape of an existing window in said aircraft and a resilient molding formed with an interiorally directed channel adapted to seize and seal said edge of said acrylic plastic sheet therewithin and an exteriorally directed periphery shaped to seat upon an existing frame inwardly of said existing window.

12. A method according to claim 11 further comprising applying a curable adhesive between said existing window frames and said exteriorally directed peripheries of said moldings prior to inserting said inner window liners into said existing frames.

* * * * *